No. 12,262. REISSUED AUG. 23, 1904.

B. HALL.

MECHANICAL MOVEMENT.

APPLICATION FILED MAY 2, 1904.

2 SHEETS—SHEET 1.

Witnesses.
Thomas J. Drummond
Harrison Owen

Inventor.
Bicknell Hall,
by Crosby & Gregory Attys.

No. 12,262.

REISSUED AUG. 23, 1904.

B. HALL.

MECHANICAL MOVEMENT.

APPLICATION FILED MAY 2, 1904.

2 SHEETS—SHEET 2.

Witnesses.

Thomas J. Drummond

Warren D. Owen.

Inventor.

Bicknell Hall, by Crosby & Gregory Attys.

No. 12,262. Reissued August 23, 1904.

UNITED STATES PATENT OFFICE.

BICKNELL HALL, OF TAUNTON, MASSACHUSETTS, ASSIGNOR TO THE HUBER-HODGMAN PRINTING PRESS COMPANY, OF TAUNTON, MASSACHUSETTS, A CORPORATION OF MASSACHUSETTS.

MECHANICAL MOVEMENT.

SPECIFICATION forming part of Reissued Letters Patent No. 12,262, dated August 23, 1904.

Original No. 753,389, dated March 1, 1904. Application for reissue filed May 2, 1904. Serial No. 206,076.

*To all whom it may concern:*

Be it known that I, BICKNELL HALL, a citizen of the United States, residing at Taunton, county of Bristol, State of Massachusetts, have invented an Improvement in Mechanical Movements, of which the following description, in connection with the accompanying drawings, is a specification, like letters on the drawings representing like parts.

This invention relates to a mechanical movement which is particularly adapted for use in that type of printing-presses in which the form is carried by a bed having a reciprocating movement under the impression-cylinder, the bed being driven during the greater portion of its stroke by a rotating gear which meshes alternately with two parallel racks secured to the bed, a reversing device controlling the bed at each end of the stroke and reversing its motion gradually while at high speed.

The invention in particular relates to the mechanism for shifting the engagement of the rotating gear with the parallel racks secured to the bed, means for driving the gear at a uniform speed when in mesh with the racks, and to the construction of the parts, whereby strength and rigidity are assured.

Figure 1:
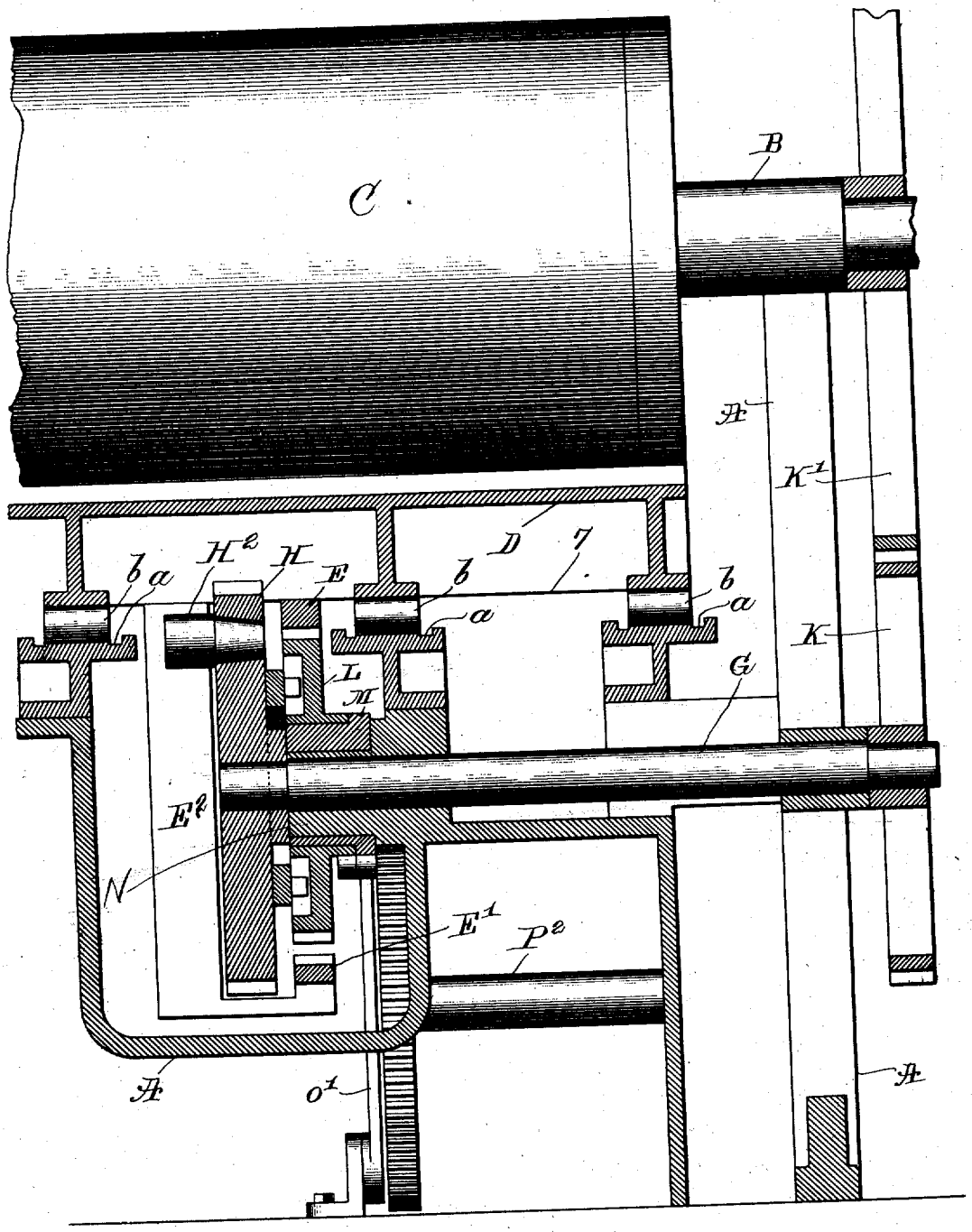
Figure 2:
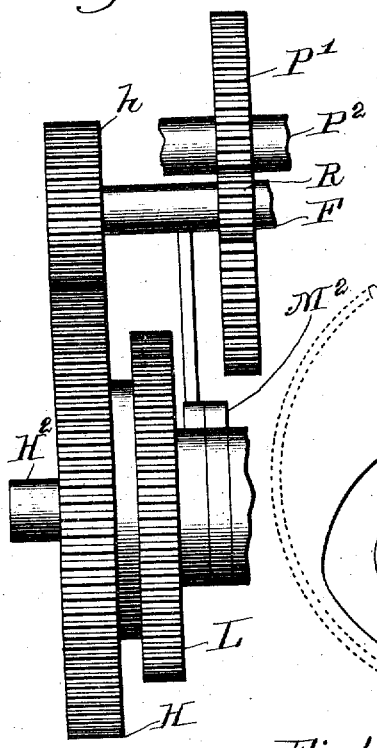
Figure 3:
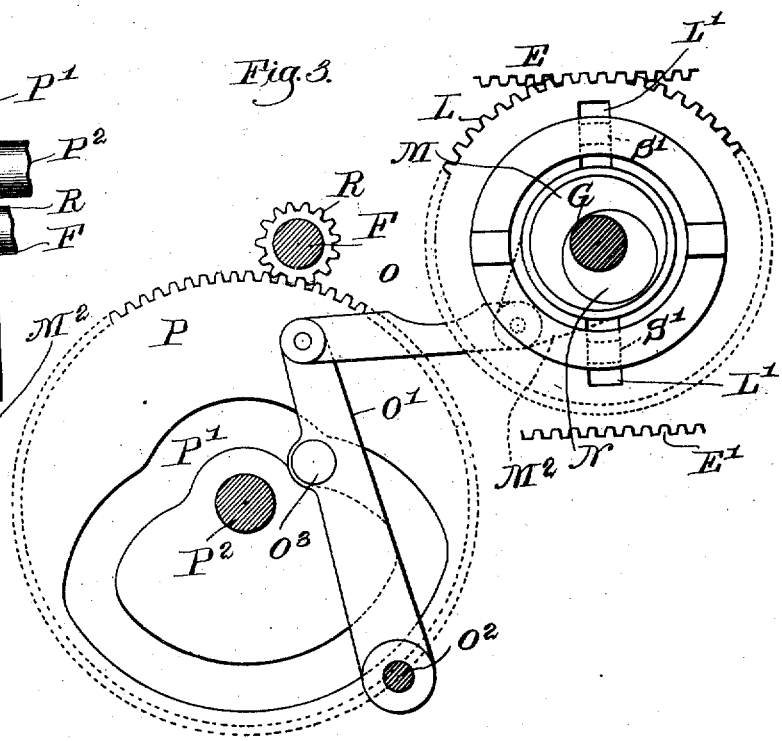
Figure 4:
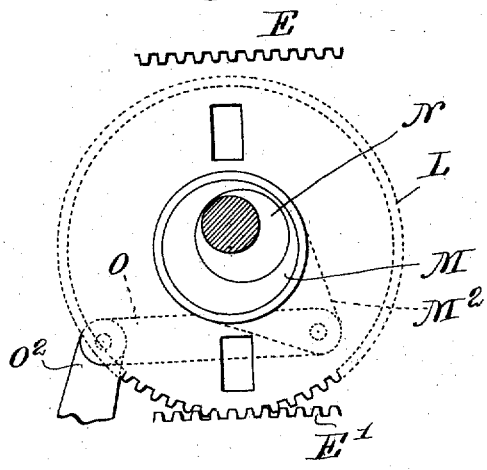
Figure 5:
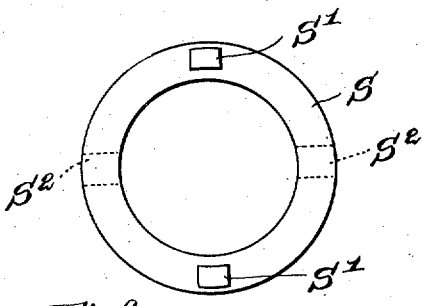
Figure 6:
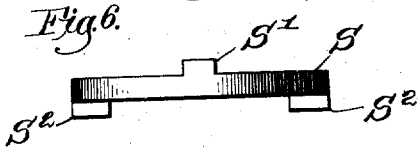

Figure 1 is a vertical elevation, chiefly in cross-section, of a portion of a well-known form of printing-press, showing parts relating to this invention. Fig. 2 is a plan view of a portion of the mechanism shown in Fig. 1. Fig. 3 is a side elevation of a portion of the mechanism shown in Fig. 1, illustrating the parts with the rotating gear in mesh with the upper rack. Fig. 4 is a cross-section corresponding to Fig. 3, but showing the rotating gear in mesh with the lower rack. Fig. 5 is a side elevation, and Fig. 6 a plan view, of the unison-ring, hereinafter referred to.

A represents the standard or main frame of the printing-press, in which is journaled the bearings B of the usual impression-cylinder C, and this standard or frame is provided with brackets *a*, on which the bed D, carrying the form, moves back and forth, antifriction-rolls *b* being interposed between the bed and the brackets *a*. The bearings of the impression-cylinder are arranged to permit of its being slightly raised during the non-printing stroke of the bed carrying the form, and the impression-cylinder makes two revolutions to each complete stroke of the bed; but the operation of all these parts is familiar and need not be described herein.

The bed D is provided with two vertically-alined parallel racks E E′, the upper of which, E, is attached directly to the bed and the lower of which, E′, is attached to the bed by means of a depending bracket $E^2$.

The main shaft F and the auxiliary shaft G are suitably journaled in the main frame A.

A large gear H is mounted on one end of the auxiliary shaft G, and this shaft is driven by means of a pinion *h*, mounted on the main shaft F and intermeshing with the gear H. A gear K on the opposite end of the auxiliary shaft G, intermeshing with the gear K′ on the impression-cylinder, serves to revolve the impression-cylinder.

A crank-pin $H^2$, carried by the gear H, usually known as the "reversing-gear," operates in any well-known manner, as with vertical shoes (not shown) carried by the hanger $E^2$, to reverse the movement of the bed D at each end of its stroke.

The bed-driving gear L is mounted between and in line with the parallel racks E E′ upon an eccentric-sleeve M, which eccentric-sleeve M is in turn mounted upon a rigid bearing N, formed on the main frame A eccentric to the auxiliary shaft G. The eccentric-sleeve M forms the bearing upon which the bed-driving gear L is journaled, and it is provided with an arm $M^2$, by means of which it may be shifted so as to cause the engagement of the bed-driving gear L either with the upper rack E or the lower rack E′, as desired in the movement of the bed. As a means for adjusting this eccentric-sleeve M at the proper time—viz., at the end of each reciprocation—to cause the bed-driving gear L to mesh with the proper rack E E′ the arm $M^2$ is shown connected by a lever O to a lever O′, pivoted at $O^2$ to a stationary part of the machine, the said lever being operated through a stud $O^3$ thereon and a cam-groove P′ in one face of the gear P. The gear P is mounted on an auxiliary shaft $P^2$ and receives its motion from a pinion R on the main shaft F.

The bed-driving gear L receives its motion from the reversing-gear H, through what is herein termed a "unison-ring." The unison-ring S (shown in Figs. 5 and 6) is provided on one side with diametrically-alined projections S′, fitting into diametrically-alined slots or grooves L′ in the bed-driving gear, and on the opposite side with projections $S^2$, alined diametrically, but at a right angle to the line of the projections S′ and fitting into corresponding slots or grooves diametrically arranged in the face of the reversing-gear H. By means of this unison-ring S motion is transmitted from the reversing-gear H to the bed-driving gear L, and the speed of the bed-driving gear L always remains uniform and equal to that of the reversing-gear H whether the bed-driving gear L is in engagement with the upper rack E or the lower rack E′. The parts are preferably arranged so that the unison-ring S is concentric with the shaft G when the bed-driving gear L is in engagement with the upper rack E.

The operation of the parts hereinbefore described is apparent. When the press is in operation and during that reciprocation of the bed when the printing takes place, the bed-driving gear L is in mesh with the upper rack E and is driven at a uniform speed, the reversing-gear H, the unison-gear S, and the bed-driving gear L being then in concentric position. When the end of the rack E is reached and the reversing mechanism comprising the stud $H^2$ of the reversing-gear H comes into action to reverse the bed, the eccentric-sleeve M is shifted, through the agency of the cam P′ and other parts hereinbefore described, from the position shown in Fig. 3 to the position shown in Fig. 4, thus causing the bed-driving gear L to be lowered out of engagement with the upper rack E and into engagement with the lower rack E′. During the return reciprocation of the bed it will be seen that the unison-ring occupies a varying eccentric position, owing to the fact that the shifting of the bed-driving gear L has rendered it eccentric to the reversing-gear H, which is the driving member; but the uniform speed of the bed-driving gear L is maintained by reason of the gradual shifting of the unison-ring S to compensate for its eccentricity, the projections S′ sliding in the grooves L′ in the bed-driving gear and the projections $S^2$ sliding in the grooves in the bed-reversing gear H. When the end of the lower rack E′ is reached, the reversing mechanism again comes into action to reverse the bed D. The eccentric-sleeve M, through the agency of the cam P′ and the parts above described, is again shifted from the position shown in Fig. 4 to that shown in Fig. 3.

From the foregoing description it will be seen that the construction of the parts is such that the bed-driving gear is firmly and rigidly supported upon its bearing whether in its upper or lower rack-engaging position and that its uniformity of motion is secured in both positions. This is accomplished without the shifting or moving of any of the shafts of the printing-press and by moving the gear itself only to the extent to disengage it from the teeth of the rack. Hitherto it has been customary either to shift the entire shaft and other connected mechanism with the bed-driving gear or else to move the gear itself upon the shaft laterally, the racks being placed out of vertical alinement. In the former case the construction is necessarily such as to prevent rigidity, and in the latter case comparatively extensive movement is necessary in order to disengage the gear from the rack laterally.

It will be noted that the rigid bearing N extends within the plane of the racks E E′ and the coöperating gear L and that the eccentric-sleeve M also extends within the same plane, making a compact, rigid, and strong construction, so that the force of reciprocating the bed acts directly against the rigid bearing and there is no tendency to deflection of the parts.

While the reversing-gear has been shown as the driving member for operating the bed-driving gear, it is evident that any other rotary member may be employed in lieu thereof, the unison-ring being connected with such rotating member and the bed-driving gear in the manner above specified.

While the unison-ring is herein shown and described as consisting of a ring-shaped part with projections on opposite sides, it is evident that the projections themselves are the operative parts of the device, and all that is essential to this feature is that the four projections shall be fixed in position with respect to each other. This obviously may be secured in other ways than by the ring-shaped connection illustrated.

While the rigid bearing N and the eccentric-sleeve M are important features of the invention, it is obvious that the unison-ring construction whereby uniform rotation of the gear from the rotary driving member is secured does not depend upon the particular support or bearing for the gear or the means for shifting the position of the gear.

Having described my invention, what I claim as new, and desire to secure by Letters Patent, is—

1. Reciprocating bed-motion comprising bed-racks, a gear located in the same plane with said racks, a stationary bearing for said gear extending within the plane of said racks and gear, means for shifting said gear transversely to said bearing to engage alternately the bed-racks.

2. Reciprocating bed-motion comprising bed-racks, a gear located in the same plane with said racks, a stationary bearing for said gear extending within the plane of said racks and gear, means for shifting said gear transversely of said bearing to engage alternately the bed-racks, means for giving a uniform rotation to said gear when in engagement with either rack.

3. Reciprocating bed-motion comprising bed-racks, a gear located in the same plane with said racks, a stationary bearing for said gear, an eccentric-sleeve between said bearing and said gear, the said stationary bearing and eccentric-sleeve extending within the plane of said racks and gear, means for shifting said eccentric whereby said gear is shifted transversely of said bearing to engage alternately the bed-racks.

4. Reciprocating bed-motion comprising bed-racks, a gear located in the same plane with said racks, a stationary bearing for said gear, an eccentric-sleeve between said bearing and said gear, the said stationary bearing and eccentric-sleeve extending within the plane of said racks and gear, means for shifting said eccentric whereby said gear is shifted transversely of said bearing to engage alternately the bed-racks, means for giving a uniform rotation to said gear when in engagement with either rack.

5. Reciprocating bed-motion comprising bed-racks, a gear located in the same plane with said racks, a stationary bearing for said gear, means for shifting said gear transversely to said bearing to engage alternately the bed-racks, a rotating member concentric with said gear when in one of its rack-engaging positions, connections between said rotating member and said gear whereby uniform rotation is imparted to said gear when in engagement with either rack.

6. Reciprocating bed-motion comprising bed-racks, a gear located in the same plane with said racks, a stationary bearing for said gear, means for shifting said gear transversely to said bearing to engage alternately the bed-racks, a rotating member concentric with said gear when in one of its rack-engaging positions, a unison-ring having diametrically-alined projections on one face in diametrically-movable engagement with said rotating member, perpendicularly-arranged diametrically-alined projections on the other face in diametrically-movable engagement with said gear, whereby uniform rotation is imparted to said gear when in engagement with either rack.

7. Reciprocating bed-motion comprising bed-racks, a gear located in the same plane with said racks, a stationary bearing for said gear extending within the plane of said racks and gear, means for shifting said gear transversely to said bearing to engage alternately the bed-racks, a rotating member, connections between said rotating member and said gear whereby uniform rotation is imparted to said gear when in engagement with either rack.

8. Reciprocating bed-motion comprising bed-racks, a gear located in the same plane with said racks, a stationary bearing for said gear, means for shifting said gear transversely to said bearing to engage alternately the bed-racks, a rotating member, a unison-ring having diametrically-alined projections on one face in diametrically-movable engagement with said rotating member, perpendicularly-arranged diametrically-alined projections on the other face in diametrically-movable engagement with said gear, whereby uniform rotation is imparted to said gear when in engagement with either rack.

9. Reciprocating bed-motion comprising bed-racks, a gear located in the same plane with said racks, a rotating member, a stationary bearing for said gear eccentric to said rotating member, an eccentric-sleeve between said bearing and said gear so arranged that said gear will be concentric to said rotating member when in one of its rack-engaging positions, means for shifting said eccentric-sleeve whereby said gear is shifted transversely of said bearing to engage alternately the bed-racks, means for giving a uniform rotation to said gear when in engagement with either rack.

10. Reciprocating bed-motion comprising bed-racks, a gear located in the same plane with said racks, a rotating member, a stationary bearing for said gear eccentric to said rotating member, an eccentric-sleeve between said bearing and said gear so arranged that said gear will be concentric to said rotating member when in one of its rack-engaging positions, means for shifting said eccentric-sleeve whereby said gear is shifted transversely of said bearing to engage alternately the bed-racks, means connecting said rotating member and said gear whereby when the rotating member is rotated uniformly a uniform rotation is given to said gear when in engagement with either rack.

11. Reciprocating bed-motion comprising bed-racks, a gear located in the same plane with said racks, means for shifting said gear transversely to engage alternately the bed-racks, a rotating member concentric with said gear when in one of its rack-engaging positions, a unison-ring having diametrically-alined projections on one face in diametrically-movable engagement with said rotating member, perpendicularly-arranged diametrically-alined projections on the other face in diametrically-movable engagement with said gear, whereby uniform rotation is imparted to said gear when in engagement with either rack.

12. Reciprocating bed-motion comprising bed-racks, a gear located in the same plane with said racks, a bearing for said gear extending within the plane of said racks and gear, means for shifting said gear transversely to engage alternately the bed-racks, a rotating member, connections between said rotating member and said gear whereby uniform rotation is imparted to said gear when in engagement with either rack.

13. Reciprocating bed-motion comprising bed-racks, a gear located in the same plane with said racks, means for shifting said gear transversely to engage alternately the bed-racks, a rotating member, a unison-ring having diametrically-alined projections on one face in diametrically-movable engagement with said rotating member, perpendicularly-arranged diametrically-alined projections on the other face in diametrically-movable engagement with said gear, whereby uniform rotation is imparted to said gear when in engagement with either rack.

14. Reciprocating bed-motion comprising bed-racks, a gear located between the racks and in the plane thereof, means for shifting said gear transversely to engage alternately the bed-racks, a rotating member at one side of the said gear, lateral connecting means movable transversely to said gear and said rotating member between said rotating member and said gear whereby uniform rotation is imparted to said gear when in engagement with either rack.

15. In a driving motion of the character described, a driving member, a driven member opposed laterally thereto, means for intermittently offsetting the axes of said driving and driven members one from the other, connecting means movable transversely to said driving member and said driven member between said driving and driven members for driving the latter from the former at a uniform speed whatever be the relative offset position of their respective axes.

16. In a driving motion of the character described, a driving member, a driven member opposed laterally thereto, means for intermittently offsetting the axis of one of said members from the other, connecting means movable transversely to said driving member and said driven member between and in positive engagement with said members to drive one from the other in any relatively offset position of their respective axes at a uniform speed.

In testimony whereof I have signed my name to this specification in the presence of two subscribing witnesses.

BICKNELL HALL.

Witnesses:

WILLIS K. HODGMAN,
FREDK. M. ATWOOD.